Aug. 11, 1959  H. W. ROCKWELL  2,898,737
FLOW CONTROL VALVE
Filed Dec. 20, 1957

Inventor
Harvey W. Rockwell
By Charles L. Schwab
Attorney

United States Patent Office 2,898,737
Patented Aug. 11, 1959

2,898,737

FLOW CONTROL VALVE

Harvey W. Rockwell, Cedar Rapids, Iowa, assignor to Allis-Chalmers Manufacturing Company, Milwaukee, Wis.

Application December 20, 1957, Serial No. 704,041

7 Claims. (Cl. 60—52)

This invention relates to an automatic control system for maintaining a substantially constant volumetric flow of hydraulic fluid with a varying volume supply.

Numerous applications utilizing hydraulic control systems require a constant volumetic supply in the presence of a pressure fluid source of variable supply. A typical use of this kind is in a tractor used with construction machinery wherein rapid steering is often required at low speeds under heavy loads, wherein a volume of hydraulic fluid is required at high pressure, while at high speeds the same volume might be required at low pressure. This occurs because the need for both maximum turning effort and maximum degree of steering most often occurs when the behicle is heavily loaded and traveling at low speed. Further, the amount of turning required at higher speeds is usually limited for reasons of safety. Ordinarily the hydraulic fluid supply may be found inadequate at low speeds and if correction is made for low speed operation an oversupply is generated during the high speed operation that leads to a surging reaction. Under these circumstances a constant flow of power fluid in a hydraulic system is necessary to assure uniformly predictable responses from elements controlled by hydraulic means. A constant flow of power fluid cannot ordinarily be obtained because the output of conventional pumps varies almost directly with the speed at which they are driven. This driven speed varies as the driving engine is operated through maximum speed, minimum torque and idle speed ranges.

Another problem closely associated with that of varying volumetric delivery of hydraulic fluid is the overheating of the fluid. This overheating may occur if a single large pump is used with a simple flow divider when high engine speeds and thus concurring high pump speeds are maintained for a long period of time so that a large volume of hydraulic fluid is forced through the flow divider under pressure. Coincident with this undesirable feature is the loss of work that this overheating represents.

It is an object of this invention to combine and automatically govern the output of power fluid from two different pumps so that a substantially constant rate of power fluid output is maintained through the entire operating speed range of the pumps.

It is a further object to provide for the sequential unloading of the supplying pumps to reduce the amount of work done by the pumps during periods when the hydraulic system requires an amount of pressure fluid which is less than that delivered by the supplying pumps.

It is a still further object to reduce the amount of heating of the fluid in the hydraulic system.

It is an object of this invention to provide a fluid control system which is supplied with a constant volume of hydraulic fluid at all pump speeds.

It is a further object of this invention to provide an improved fluid control unit of the hereinbefore outlined character which is economical to manufacture, is compact and gives satisfactory service.

These and other objects and advantages of this invention will be evident when the following description is read in conjunction with the accompanying drawings, in which.

Figure 1:
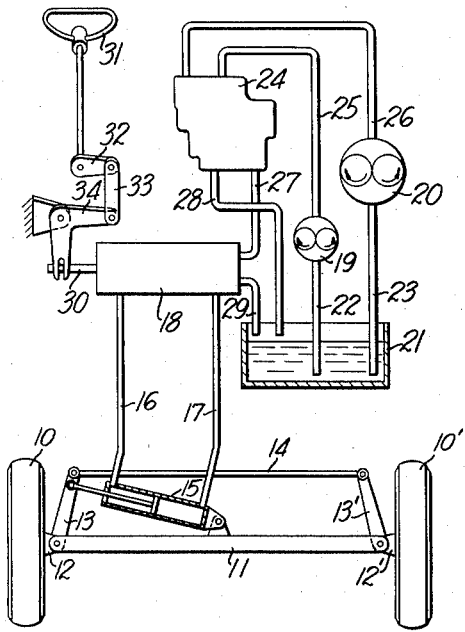
Fig. 1 is a schematic view showing a power steering mechanism incorporating the automatic control system of this invention.

Fig. 1 shows the volume control relay valve of this invention incorporated in a steering mechanism shown schematically. A pair of steerable wheels 10, 10' are mounted on an axle tree 11 by a pair of spindles 12, 12'. The spindles are pivotally connected to the axle tree 11 on vertical axes and have steering arms 13, 13' which are interconnected with the stabilizer link 14. A double acting hydraulic motor 15 in the form of a ram has its cylinder pivotally connected to the axle tree 11 and has its piston rod pivotally connected to the steering arm 13. The hydraulic ram or motor 15 is double acting and has the opposite ends of its cylinder connected to the fluid supplying conduits 16 and 17. The motor supplying conduits 16 and 17 are in turn connected to a pair of fluid output ports and a fluid directing valve or steering valve 18. The fluid is supplied to the hydraulic system by two gear type pumps 19 and 20 which respectively draw fluid from the reservoir 21 through conduits 22 and 23. Interposed between the two gear type pumps and the steering control valve 18 is the volume control relay valve 24 of this invention. Fluid is supplied from the two gear type pumps to the volume control relay valve 24 by conduits 25 and 26 and from the volume control valve 24 to the steering valve 18 by conduit 27. A relief conduit 28 connects the volume control relay valve 24 with the reservoir 21. Another relief conduit 29 connects the steering valve 18 with the reservoir 21. A valve spool 30 controls the fluid flow through the steering valve 18 and this valve spool is shifted by manual actuation of the steering wheel 31 through the linkage members 32, 33 and 34.

Figure 2:
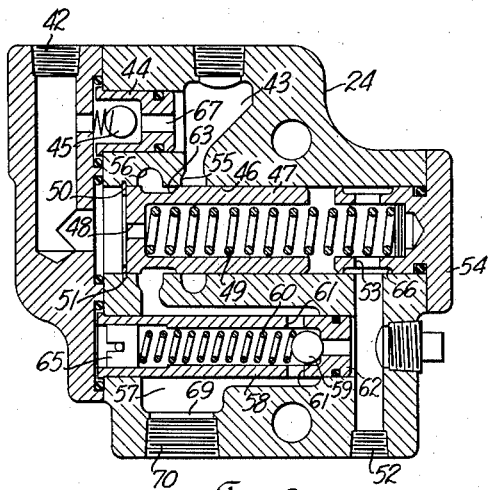
Fig. 2 is a section view of the relay valve of this invention shown in a position where the input from both supply pumps is directed to the pressure fluid outlet.

Fig. 2 shows a section view of the volume control relay valve. Hydraulic fluid enters the valve through the first pressure fluid input passage 42 and the second pressure fluid input passage 43 in the body of the valve 24 that are interconnected by a passage 67 containing a check valve 44 with a ball check 45 which is spring biased to allow unidirectional flow from the second pressure fluid input passage 43 to the first pressure fluid input passage 42. The first pressure fluid input passage 42 connects with the end of the bore 46 in the valve body. Slidably disposed in the bore 46 is the piston type slide valve 47 with an annular recess 63 in the periphery and an orifice 48 in the face of the piston 47 which is biased by the spring 49 against the plunger seat 50. The plunger seat is mounted in an annular recess 51 in the bore 46 of the valve. The working fluid output passage 52 connects with the bore 46 through the openings 53 in the retainer cap 54 and the annular recess 66. The second fluid input passage 43 connects with an annular recess 55 in the bore 46. A second annular recess 56 in the bore 46 connects to the relief chamber 57 which is connected by the fluid relief passage 69 to the fluid return outlet 70 leading from the valve to the reservoir. A relief valve 58 is provided to prevent accidental damage due to a build-up of excessive pressure in the working fluid output passage 52. The need for pressure relief is a result of the principal elements of the valve being responsive only to the volumetric flow of hydraulic fluid and subject to activation upon variations of volumetric flow. The basic structure of the relay valve exerts no control over the pressure of the hydraulic system and is actually insensitive to the operating pressure of the system. This is composed of a ball check 59 which is biased by a spring 60 toward the fluid output passage 52 and when opened against the pressure of the biasing spring 60 communicates through the ports 61 in the sleeve 62 of the valve to the return chamber 57. An adjusting nut 65 is provided to enable the relief pressure to be varied.

This relay valve 24 maintains a substantially constant flow by maintaining an essentially constant pressure differential across the restricting orifice 48 in the face of the slidable piston 47. This pressure differential is fixed by the size and configuration of the orifice and the spring tension provided by the biasing spring 49.

Fig. 2 illustrates the condition where the volumetric relay valve is functioning at a low engine speed. In conventional pumps the output varies almost directly with the engine speed. In a system where the volume of hydraulic fluid required is half the combined rated outputs of the pumps and when the pump outputs are at about half the rated amounts the entire volume of pressure fluid from the pumps is required by the hydraulic system. In this situation the piston 47 remains biased against the plunger seat 50 and the ball check 44 of the check valve is unseated. The hydraulic fluid in the second pressure fluid inlet passage 43 flows through the connecting passage 67 and the combined flow passes through the orifice 48 of the piston valve 47 and travels through the hollow center portion of the piston valve. The power fluid then enters the hollow center of the retainer cap 54 and passes through holes 53 drilled in the retainer cap into an annular groove 66 machined on the outside of the cap. This groove communicates with the working fluid output passage 52 leading to the working fluid outlet port. This port is normally connected with an inlet port of a control valve which appropriately directs the power fluid to the fluid controlled device.

Figure 3:
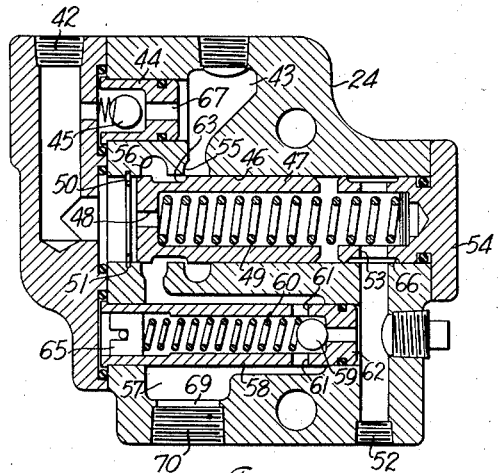
Fig. 3 is a section view of the relay valve shown in a position wherein a portion of the power fluid from the second pump is directed back to the reservoir.

Referring to Fig. 3, at moderate engine speeds the combined output of the two supply pumps may exceed the design flow rate of the constant volume relay valve. This increased delivery causes an increased pressure in the first pressure fluid input passage 42 with the attendant increased volume of flow. The increase in the pressure differential across the orifice 48 causes the piston 47 to move against the biasing spring 49. As the piston moves to an intermediate position the annular recess 63 in the piston is placed in communication with the annular recess 55 in the bore which connects to the second pressure fluid inlet passage 43 establishing an annular orifice which allows a portion of the supply from the second pressure fluid input passage to be returned to the reservoir through the circular recess in the bore 46 connecting with the relief chamber 57. In this new equilibrium position part of the supply from the second pressure fluid input passage is returned to the reservoir and the remainder passes through the check valve 44 to combine with the fluid in the first pressure fluid input passage. In this condition, all of the fluid supplied from the first pump through the first pressure fluid inlet and a portion of the fluid supplied by the second pump through the second pressure fluid inlet opening are delivered through the plunger orifice and the hollow chamber within the piston valve to the working fluid outlet passage.

Figure 4:
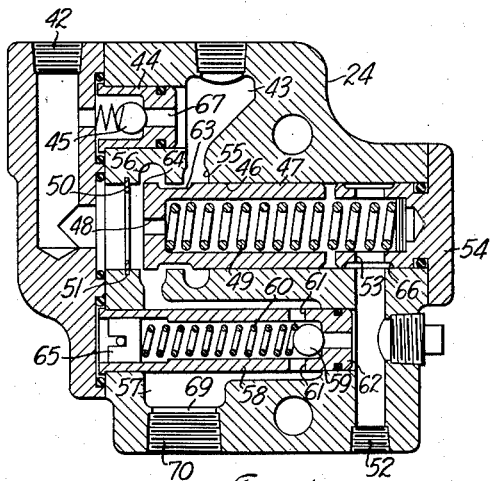
Fig. 4 is a section view showing the relay valve wherein all the fluid from the second pump and a portion of the fluid from the first pump is returned to the reservoir.

Referring to Fig. 4, at high engine speeds a condition may be attained wherein the supply from the first pump alone exceeds the design output volume of the valve. When this occurs the pressure differential across the orifice 48 in the plunger face increases and the piston 47 will once again move against the biasing spring 49 until the pressure on the input side of the piston is reduced to restore the pressure differential across the orifice and thereby establish a new equilibrium condition.

In this condition the piston has moved sufficiently against the biasing spring to form an annular orifice between the sharp peripheral edge 64 of the piston and the annular recess 56 in the bore placing the first pressure fluid input passage 42 in communication with the relief chamber 57. Thus the design volume of fluid is allowed to pass through the orifice and the excess from the first pump is returned to the reservoir. At this time the entire pressure fluid supply from the second pressure fluid source flows through the annular recess 55 connected to the second pressure fluid passage 43 through the recess 63 in the piston slide valve to the annular opening 56 in the bore of the piston cylinder communicating with the relief chamber 57 and the fluid relief passage 69. The ball check 45 of the check valve 44 connecting passage 67 is now seated by the higher pressure in the first pressure fluid input passage 42 and the passage established communicating with the reservoir is sufficient in size throughout to remove substantially all the back pressure against which the second pressure fluid supply pump is operating.

In operation, power fluid is supplied by two pumps which are usually of different rated capacity. The larger pump 20 connected to the first pressure fluid passage, for instance, may have a rated capacity approximately twice that of the smaller pump 19 supplying fluid to the second pressure fluid input passage. At low speeds the condition exists which is described above in conjunction with Fig. 2 wherein the entire pressure fluid supply is less than or equivalent to the design output of the relay valve with the result that the ball check 45 in the connecting passage is open allowing the entire combined flow to pass to the working fluid outlet passage. As the flow increases the pressure differential across the orifice increases causing the piston to move against the biasing spring to a new position of equilibrium for each value of combined pump input. The first occurrence is a partial redirecting of the fluid from the second pressure fluid passage 43 to the reservoir as the extremity of the annular recess 63 in the piston places the annular recesses 55 and 56 of the bore 46 in communication with one another. This is the condition illustrated by Fig. 3. Further increase in the supply volume causes a further motion of the piston to a position wherein all the fluid from the second input passage 43 is returned to the reservoir while the entire flow of the first input passage 42 is directed to the working fluid output passage 52. At this point the ball check 45 of the check valve 44 becomes seated terminating communication between the first and second fluid input passages 42 and 43. The next increment of volumetric delivery to the valve will cause the piston to move to a position wherein the first fluid input passage communicates with the reservoir by means of the annular recess 56 as shown in Fig. 4. Further increases in volumetric supply will merely increase the proportion of fluid from the first fluid input passage that is returned to the reservoir.

Although the invention has been described in its preferred form with a degree of particularity, it should be understood that the present disclosure has been made only by way of example and that changes in the details of construction and the combination and arrangements of parts may be made without departing from the spirit and scope of the invention as hereinafter claimed.

What is claimed is:

1. An automatic volumetrically and pressure operated relay valve comprising: a valve body with interior walls forming a bore and a pair of axially spaced annular recesses communicating with said bore; first and second pressure fluid input passages communicating, respectively, with said bore; a connecting passage between said input passages; a check valve in said connecting passage allowing hydraulic fluid to flow from said second input passage to said first input passage; a working fluid output passage; a fluid relief passage; a piston valve slidably disposed in said bore having an end in communication with said first input passage and its other end in communication with the said output passage; an orifice in said piston valve face; biasing means urging said piston valve toward said first fluid input passage; said piston valve being shiftable against said biasing means from a first position wherein fluid is prevented from flowing from said input passages to said relief passage, to a second position upon a pressure differential at its ends reaching a predetermined amount wherein said second input passage is in communication with the said fluid relief passage, and further shiftable against the said biasing means upon the pressure differential at the opposite ends of said valve reaching a second predetermined amount to a position where both input passages are in communication with the relief passage; said first predetermined amount being less than said second predetermined amount.

2. An automatic volumetrically and pressure operated relay valve comprising: a valve body with interior walls forming a bore therein and a pair of axially spaced annular recesses communicating with said bore; first and second pressure fluid input passages communicating, respectively, with said bore; a first connecting passage between said input passages; means in said first connecting passage allowing unidirectional flow from said second input passage to said first input passage; a working fluid output passage; a fluid relief passage; a second connecting passage between said first input passage and said output passage; restricting means in said second connecting passage; a piston valve slidably disposed in said bore having an end in communication with said first input passage and its other end in communication with the said output passage; and biasing means urging said piston valve toward said first input passage; said piston valve being shiftable against said biasing means from a first position wherein fluid is prevented from flowing from said input passages to said relief passage, to a second position upon a pressure differential at its ends reaching a predetermined amount wherein the said second input passage is in communication with the said relief passage, and further shiftable against said biasing means upon the pressure differential at opposite ends of said piston valve reaching a second predetermined amount to a position where both input passages are in communication with the relief passage; said first predetermined amount being less than said second predetermined amount.

3. An automatic volumetrically and pressure operated relay valve comprising: a valve body; a plurality of pressure fluid inlets in said body; a working fluid outlet in said body; a fluid relief outlet in said body; a bore in said body; a plurality of ports in said bore; a plurality of passage means in said valve body establishing communication between said inlets and said bore and said outlets and said bore, respectively; a valve piston slidably disposed in said bore; and biasing means urging said piston toward one extreme position at one end of said bore whereby with said piston in said one extreme position fluid from both fluid inlets will flow to said fluid outlet until the volume of said fluid reaches a value sufficient to move said piston to an intermediate position against the force exerted by said biasing means, at which time fluid from one pressure fluid inlet will flow to said pressure fluid outlet and the fluid from the other pressure fluid inlet will flow to said fluid relief outlet, and whereby upon the volume of said fluid reaching a value sufficient to move the said piston to a further position, fluid from both pressure fluid inlets flows to said fluid relief outlet.

4. An automatic volumetrically and pressure operated relay valve comprising: a valve body with interior walls forming a bore, and a pair of axially spaced annular recesses communicating with said bore; a first and second pressure fluid input passages; said first input passage communicating with said bore; said second input passage communicating with a first annular recess in said bore; a first connecting passage between said input passages; means in said first connecting passage allowing unidirectional flow from said second input passage to said first input passage; a working fluid output passage; a fluid relief passage communicating with a second annular recess in said bore; a second connecting passage between said first input passage and said output passage; restricting means in said second connecting passage; a valve piston slidably disposed in said bore having an end in communication with said first input passage and its other end in communication with said output passage; biasing means urging the said piston toward the first input passage; and an annular recess in the periphery of said piston; said piston being automatically adjustable in response to variations in volumetric flow through said input passages to provide a first adjusted position of said piston wherein both said first and second input passages communicate solely with the output passage, a second adjusted position of said piston wherein the second fluid input passage communicates through said annular recesses in said bore and piston with said relief passage, and a third adjusted position of said piston wherein both input passages communicate through said annular recesses of said bore and piston to said relief passage.

5. A valve as defined in claim 4 and further comprising a pressure actuated relief valve which places the working fluid output passage in communication with the relief passage when the fluid pressure in the working fluid output passage reaches a predetermined amount.

6. An automatic volumetrically and pressure operated relay valve comprising: a valve body with interior walls forming a bore therein; two pressure fluid inlet passages in said body communicating with said bore independently of one another; a working fluid outlet passage in said body communicating with said bore; a fluid relief passage in said body communicating with said bore; passage means between said inlet passages allowing unidirectional flow; a valve piston slidably disposed in said bore; an annular recess in the periphery of said piston; said piston being automatically adjustable in response to variations in volumetric flow through said inlets to provide a first adjusted position of said piston wherein both said first and second inlet passages communicate solely with the working fluid outlet passage; a second adjusted position of said piston wherein the second fluid input passage communicates through the said annular recess in said piston with said relief passage, and a third adjusted position of said piston wherein both input passages communicate through said annular recess in said piston with said relief passage.

7. In a hydraulic control system of the type having a fluid motor; a fluid reservoir; first and second fluid pumps, each having a suction and a discharge side; and a fluid directing valve; an automatic volumetrically and pressure operated relay valve comprising; a valve body with interior walls forming a bore and a pair of axially spaced annular recesses communicating with said bore; first and second pressure fluid input passages respectively communicating with the said bore and a first annular recess in said bore; a first connecting passage between said input passages; means in said first connecting passage allowing unidirectional flow from said second input passage to said first input passage; a working fluid output passage; a fluid relief passage; a second annular recess in said bore communicating with said relief passage, a second connecting passage between said first fluid input passage and said working fluid output passage; restricting means in said second connecting passage; a valve piston slidably disposed in said bore having an end in communication with said first input passage and its other end in communication with said output passage; means biasing said piston toward the first input passage and an annular recess in the periphery of said piston; passage means respectively interconnecting the suction sides of the said first and second pumps with the reservoir, the discharge sides of the said first and second pumps individually with said relay valve, the relay valve and the hydraulic control valve, the hydraulic control valve and said fluid motor, and said reservoir with said hydraulic control valve and relay valve.

References Cited in the file of this patent

UNITED STATES PATENTS

| | | |
|---|---|---|
| 2,074,618 | Roeder | Mar. 23, 1937 |
| 2,549,897 | Evrell | Apr. 24, 1951 |
| 2,733,662 | Hunter | Feb. 7, 1956 |

FOREIGN PATENTS

| | | |
|---|---|---|
| 1,108,743 | France | Sept. 14, 1955 |